US009476976B2

(12) United States Patent
Kijima et al.

(10) Patent No.: US 9,476,976 B2
(45) Date of Patent: Oct. 25, 2016

(54) OBJECT RECOGNITION APPARATUS AND VEHICLE

(71) Applicant: HONDA MOTOR CO., LTD., Minato-Ku, Tokyo (JP)

(72) Inventors: Yoshitaka Kijima, Utsunomiya (JP); Yoji Sasabuchi, Tochigi-Ken (JP); Takuya Kashiki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/714,396

(22) Filed: May 18, 2015

(65) Prior Publication Data

US 2015/0338516 A1   Nov. 26, 2015

(30) Foreign Application Priority Data

May 21, 2014   (JP) .................................. 2014-105037

(51) Int. Cl.
| | |
|---|---|
| *G01S 13/86* | (2006.01) |
| *G06K 9/00* | (2006.01) |
| *G06K 9/62* | (2006.01) |
| *G01S 13/06* | (2006.01) |
| *G01S 7/41* | (2006.01) |
| *B60W 30/00* | (2006.01) |
| *B60W 30/08* | (2012.01) |
| *G01S 13/93* | (2006.01) |
| *G08G 1/16* | (2006.01) |

(52) U.S. Cl.
CPC .............. *G01S 13/867* (2013.01); *B60W 30/00* (2013.01); *B60W 30/08* (2013.01); *G01S 7/41* (2013.01); *G01S 13/06* (2013.01); *G01S 13/931* (2013.01); *G06K 9/00805* (2013.01); *G06K 9/00825* (2013.01); *G06K 9/62* (2013.01); *G08G 1/166* (2013.01); *G08G 1/167* (2013.01); *B60W 2420/42* (2013.01); *B60W 2420/52* (2013.01); *B60W 2550/10* (2013.01)

(58) Field of Classification Search
CPC ........ G01S 13/867; G01S 7/41; G01S 13/06; B60W 30/00; B60W 2550/10; B60W 2420/42; B60W 2420/52; G06K 9/62; G06K 9/00805; G06K 9/00825
USPC .......................................................... 701/1
See application file for complete search history.

(56) References Cited

U.S. PATENT DOCUMENTS

| | | | | |
|---|---|---|---|---|
| 2006/0125679 | A1* | 6/2006 | Horibe .................. | G01S 17/023 342/52 |
| 2007/0168128 | A1* | 7/2007 | Tokoro .................. | B60R 21/013 701/301 |
| 2014/0292502 | A1* | 10/2014 | Sakima ................. | B60W 30/09 340/435 |

* cited by examiner

*Primary Examiner* — Brian P Sweeney
(74) *Attorney, Agent, or Firm* — Carrier Blackman & Associates, P.C.; Joseph P. Carrier; Jingli Wang

(57) ABSTRACT

In an object recognition apparatus or a vehicle equipped with the same, a first target area, for judging whether or not a target object is to be treated as a target of a behavior supporting action, is set as one portion of a first detection region, and a second target area, for judging whether or not the target object is to be treated as the target of the behavior supporting action, is set as one portion of a second detection region. If the position of a first peripheral object such as a radar target exists within the first target area and the position of a second peripheral object such as a camera target exists within the second target area, the target object is treated as the target of the behavior supporting action.

7 Claims, 7 Drawing Sheets

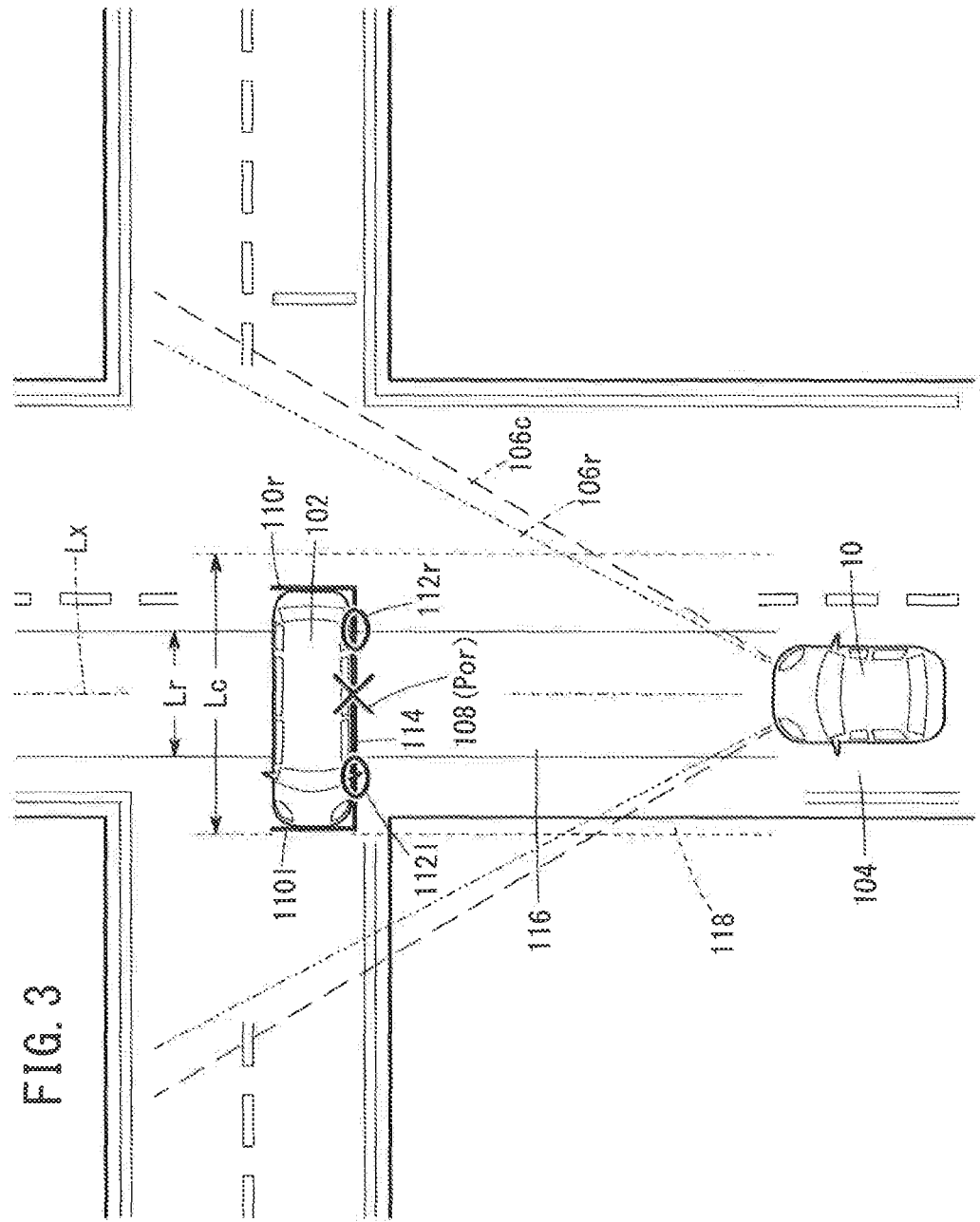

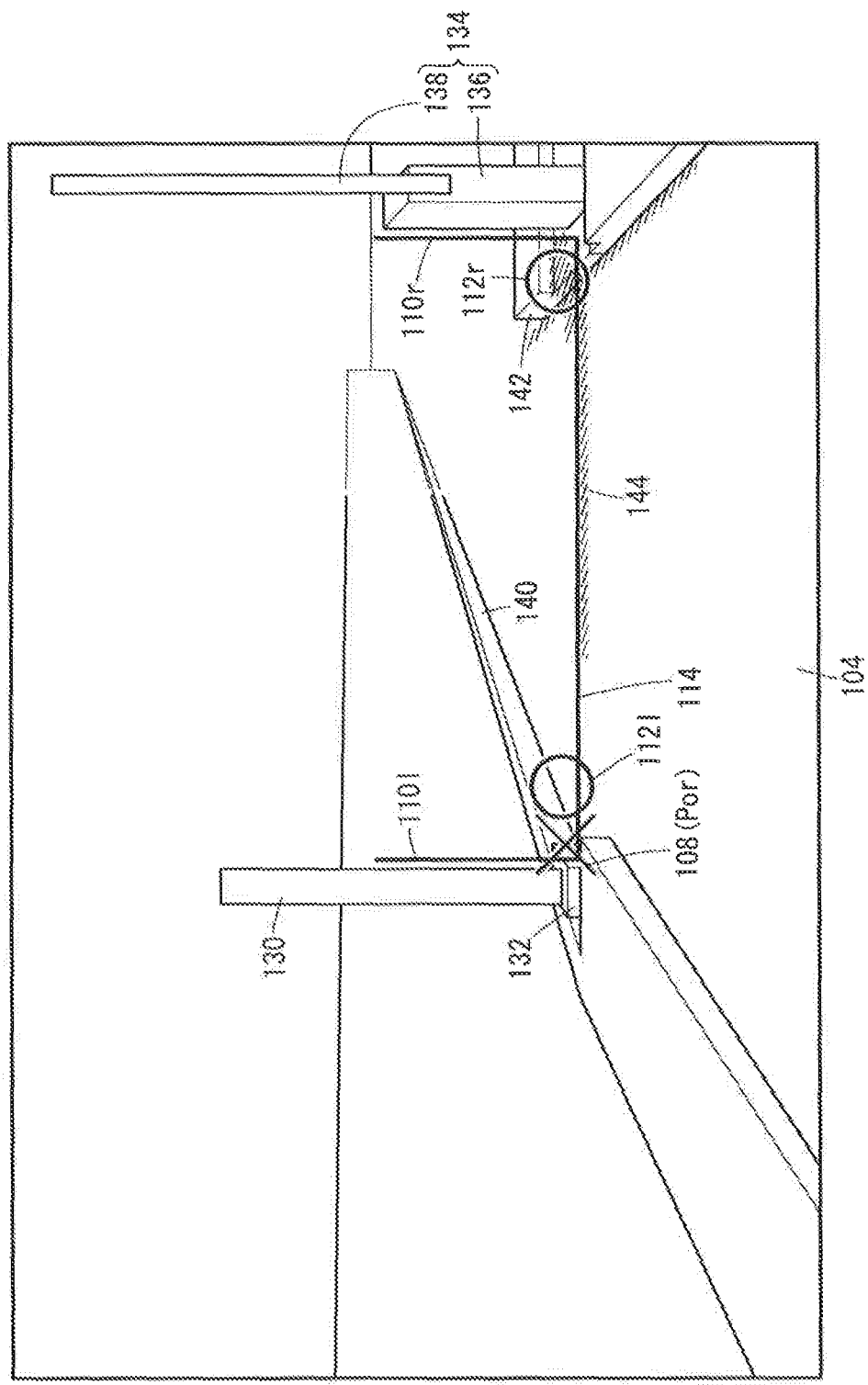

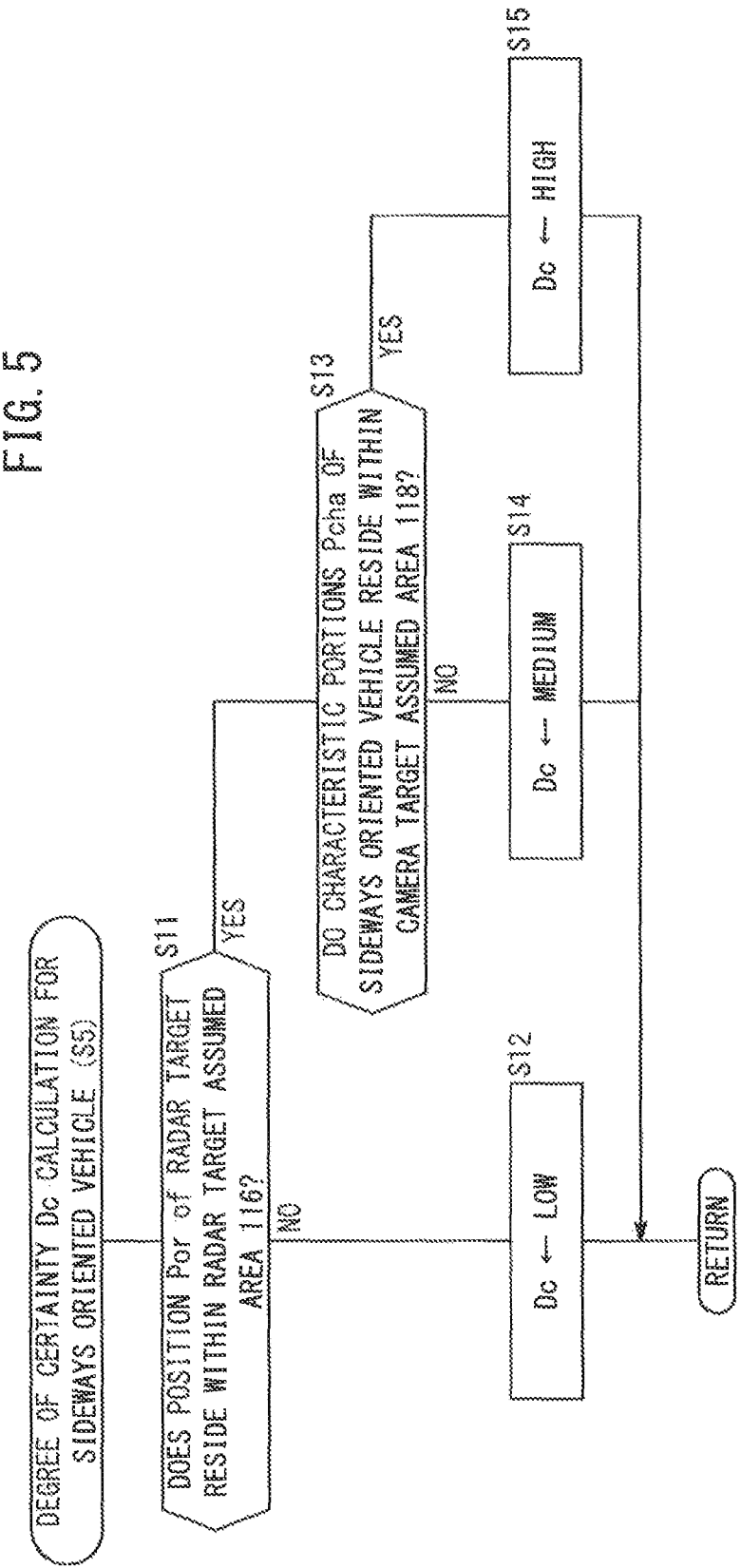

FIG. 6

| RELATIONSHIPS BETWEEN POSITION Por OF RADAR TARGET AND CHARACTERISTIC PORTIONS Pcha OF SIDEWAYS ORIENTED VEHICLE, AND RADAR TARGET ASSUMED AREA 116, AND CAMERA TARGET ASSUMED AREA 118 | DEGREE OF CERTAINTY Dc | DRIVING SUPPORT |
|---|---|---|
| Por: WITHIN AREA 116<br>Pcha: WITHIN AREA 118 | HIGH | AUTOMATIC BRAKING AND WARNING |
| Por: WITHIN AREA 116<br>Pcha: OUTSIDE OF AREA 118 | MEDIUM | WARNING |
| Por: OUTSIDE OF AREA 116<br>Pcha: WITHIN AREA 118 | LOW | NONE |
| Por: OUTSIDE OF AREA 116<br>Pcha: OUTSIDE OF AREA 118 | | |

OBJECT RECOGNITION APPARATUS AND VEHICLE

CROSS-REFERENCE TO RELATED APPLICATION

This application is based upon and claims the benefit of priority from Japanese Patent Application No. 2014-105037 filed on May 21, 2014, the contents of which are incorporated herein by reference.

BACKGROUND OF THE INVENTION

1. Field of the Invention

The present invention relates to an object recognition apparatus for recognizing a peripheral object that exists around the periphery of a mobile object, as well as to a vehicle that is equipped with such an object recognition apparatus.

2. Description of the Related Art

With the vehicle running support system disclosed in U.S. Patent Application Publication No. 2007/0168128 (hereinafter referred to as "US2007/0168128A1"), an obstacle detection result performed by a millimeter wave radar 21, and an obstacle detection result performed by an image recognition means 22 are referred to, and a branching operation is performed between a case in which both of the millimeter wave radar 21 and the image recognition means 22 detect an obstacle, and a case in which only one of the millimeter wave radar 21 and the image recognition means 22 detects the obstacle. In addition, by modifying the initial conditions for the running support control corresponding to the branching result, a support control is implemented, which is responsive to the attention or inattention of the driver (abstract, FIG. 5). Concerning the case in which both of the millimeter wave radar 21 and the image recognition means 22 detect the obstacle, in US2007/0168128A1 it is explained that, in the event the obstacle is detected by both the millimeter wave radar as well as the image recognition means, there is a high possibility that the object has been detected correctly, and therefore, the support control is implemented at a normal timing (paragraph [0083]).

SUMMARY OF THE INVENTION

As described above, according to US2007/0168128A1, in the event that an obstacle detection result can be obtained respectively by both the millimeter wave radar and the image recognition means, there is a high possibility that the object has been detected correctly, and the support control is implemented at a normal timing (paragraph [0083]). However, even in cases where an obstacle is detected respectively by both the millimeter wave radar and the image recognition means, according to the detection conditions thereof, changes may take place concerning the degree of accuracy in selecting or in determining the presence of a target object. With US2007/0168128A1, investigations have not been undertaken concerning this point, and thus room remains for improvement.

The present invention has been devised taking into consideration the aforementioned problems, and has the object of providing an object recognition apparatus and a vehicle incorporating the same, which is capable of improving the accuracy in selecting a target object or the accuracy in determining the presence of a target object, or which is capable of appropriately performing a level setting for a behavior supporting action.

An object recognition apparatus according to the present invention is characterized by a first detecting device configured to detect first position information indicating a position of a first peripheral object that exists within a first detection region established around periphery of a mobile object, a second detecting device configured to detect second position information indicating a position of a second peripheral object that exists within a second detection region, wherein the second detection region overlaps with all or a portion of the first detection region, a target object setting device configured to set a target object by matching the first peripheral object and the second peripheral object using the first position information and the second position information, and a behavior support control device configured to control a behavior supporting action of the mobile object in relation to the target object. The behavior support control device is configured to set a first target area which is used to judge whether or not the target object is to be treated as a target of the behavior supporting action, as a portion of the first detection region, and set a second target area which is used to judge whether or not the target object is to be treated as the target of the behavior supporting action, as a portion of the second detection region. If the position of the first peripheral object exists within the first target area and the position of the second peripheral object exists within the second target area, the target object is treated as the target of the behavior supporting action. If the position of the first peripheral object does not exist within the first target area or the position of the second peripheral object does not exist within the second target area, the target object is removed from being the target of the behavior supporting action, or the behavior supporting action with respect to the target object is suppressed.

According to the present invention, if the position of the first peripheral object exists within the first target area and the position of the second peripheral object exists within the second target area, the target object is treated as a target of the behavior supporting action. Further, in the case that the position of the first peripheral object does not exist within the first target area or the position of the second peripheral object does not exist within the second target area, the target object is removed from being the target of the behavior supporting action, or the behavior supporting action with respect to the target object is suppressed. The first target area is set as a portion of the first detection region (or in other words, as an area that is narrower than the first detection region) of the first detecting device. The second target area is set as a portion of the second detection region (or in other words, as an area that is narrower than the second detection region) of the second detecting device.

Consequently, by using the target areas, both of which are suitable respectively for the first detection device and the second detection device, it can be determined whether or not to treat the target object as a target of the behavior supporting action, or whether or not to suppress the behavior supporting action. Accordingly, selection of a target object or determining the presence of a target object as a target of the behavior supporting action can be performed with high accuracy, or setting of a level for a behavior supporting action can be performed appropriately.

For example, if the first detecting device is a radar and the second detecting device is a camera, the behavior support control device may set the first target area to be narrower than the second target area.

In accordance with this feature, the first target area based on the radar is set as an area that is narrower than the first detection region of the radar, and the second target area based on the camera is set as an area that is narrower than the second detection region of the camera. In general, the radar is weak or performs poorly at detecting edges of an object. Further, in the case that the mobile object is a sideways oriented vehicle, based on reflected waves from roadside obstructions such as curbstones or the like, there is a possibility to erroneously recognize such obstructions as target objects. According to the present invention, the first target area based on the radar is set relatively narrow, whereas the second target area based on the camera is set relatively wide. Consequently, by using the detection result of the camera in relation to areas where the radar is week or poor in performance, selection of a target object or determining the presence of a target object as a target of the behavior supporting action can be performed with high accuracy, or setting of a level for a behavior supporting action can be performed appropriately.

The behavior support control device may treat the target object as the target of the behavior supporting action, if the position of the first peripheral object exists within the first target area and an image feature of the second peripheral object exists entirely within the second target area. In accordance with this feature, by treating a target object, the entirety of which is captured by the camera, as the target of the behavior supporting action, selection of a target object or determining the presence of a target object as the target of the behavior supporting action can be performed with high accuracy, or setting of a level for a behavior supporting action can be performed appropriately.

Assuming that the target object is a sideways oriented vehicle, the image feature may include at least one of a vertical edge constituting a left end of the sideways oriented vehicle and a circular edge constituting a left side wheel of the sideways oriented vehicle, and at least one of a vertical edge constituting a right end of the sideways oriented vehicle and a circular edge constituting a right side wheel of the sideways oriented vehicle. Owing to this feature, the presence of a sideways oriented vehicle can be determined with high accuracy.

In the case that a center or a gravitational center of the first peripheral object is positioned between the left end and the right end or is positioned between the left side wheel and the right side wheel of the sideways oriented vehicle, the behavior support control device may treat the target object as being the target of the behavior supporting action. Further, in the case that a center or a gravitational center of the first peripheral object is not positioned between the left end and the right end or is not positioned between the left side wheel and the right side wheel of the sideways oriented vehicle, the behavior support control device may remove the target object from being the target of the behavior supporting action.

Owing to this feature, based on the detection result of the radar, in the case that the center or the gravitational center of the first peripheral object exists at a position that differs from the center or the gravitational center of a sideways oriented vehicle, it can be determined that the target object is not a sideways oriented vehicle. Therefore, selection of a target object or determining the presence of a target object as a target of the behavior supporting action can be performed with high accuracy, or setting of a level for a behavior supporting action can be performed more appropriately.

The target object setting device may recognize the target object as being a sideways oriented vehicle existing on a travel path of the mobile object, and the behavior support control device may set the first target area and the second target area so as to lie on the travel path. As a result, even in the case that the target object setting device mistakenly recognizes that a sideways oriented vehicle exists as a target object on the travel path of the mobile object, the target object can be removed from being the target of the behavior supporting action, or the behavior supporting action with respect to the target object can be suppressed.

The vehicle according to the present invention is characterized as a mobile object that includes the aforementioned object recognition apparatus.

The object recognition apparatus according to the present invention comprises a radar configured to detect first position information indicating a position of a first peripheral object that exists within a first detection region established around periphery of a mobile object, a camera configured to detect second position information indicating a position of a second peripheral object that exists within a second detection region, wherein the second detection region overlaps with all or a portion of the first detection region, and a target object setting device configured to set a target object, which is a sideways oriented vehicle, by matching the first peripheral object and the second peripheral object using the first position information and the second position information. The target object setting device is configured to set a characteristic portion target area which is used to extract a characteristic portion of the sideways oriented vehicle on a basis of a position of the first peripheral object and as a portion of the second detection region. In addition, the target object setting device judges the first peripheral object and the second peripheral object as being the same target object, which is the sideways oriented vehicle, if the characteristic portion of the sideways oriented vehicle exists within the characteristic portion target area.

According to the present invention, the second target area for extracting a characteristic portion of the sideways oriented vehicle is set on the basis of a position of the first peripheral object detected by the radar, and as a portion of the second detection region (the detection region of the camera). In addition, if the characteristic portion of the sideways oriented vehicle exists within the second target area, the first peripheral object and the second peripheral object are judged as being the same target object, which is the sideways oriented vehicle. Owing to this feature, the second target area (i.e., a portion of the detection region of the camera) for extracting a characteristic portion of the sideways oriented vehicle can be set as a comparatively narrow area on the basis of the position of the first peripheral object that is detected by the radar. Accordingly, selection or determination of the presence of the target object, which is a sideways oriented vehicle, can be carried out with high accuracy and a small amount of computation.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a descriptive drawing for explaining the driving support control process of the aforementioned embodiment;

FIG. 4 is a drawing showing an example in which a target object setting unit mistakenly recognizes a target object, and erroneously judges the presence of a sideways oriented vehicle;

FIG. 5 is a flowchart (details of step S5 of FIG. 2) of a process for calculating a degree of certainty in detecting the presence of a sideways oriented vehicle;

FIG. 6 is a diagram for describing a judgment standard and method of use (content of a driving support process) of the degree of certainty in detecting the presence of a sideways oriented vehicle in the aforementioned embodiment.

DESCRIPTION OF THE PREFERRED EMBODIMENTS

A. Embodiment

A1. Configuration

A1-1. Overall Configuration

Figure 1:
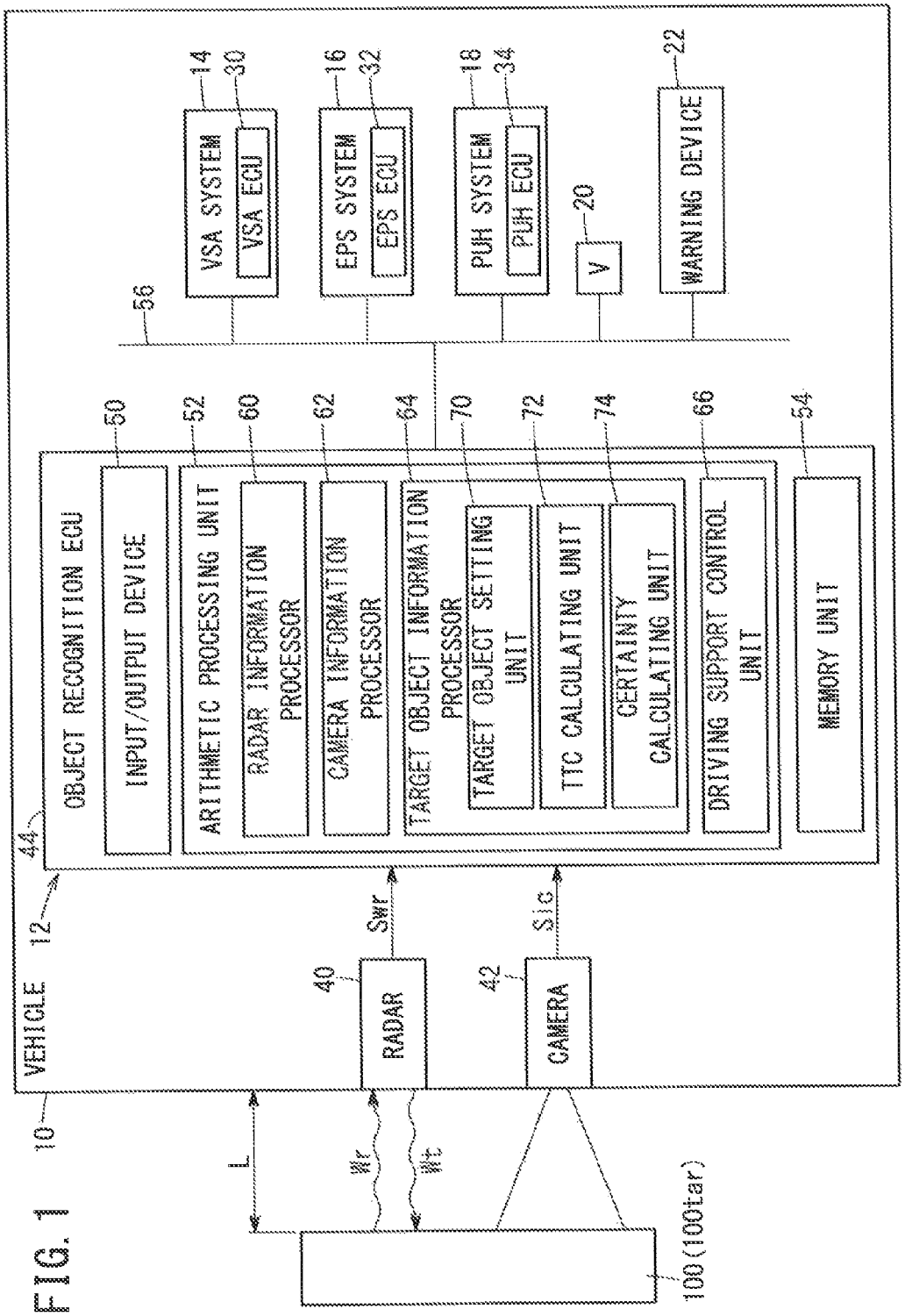
FIG. 1 is a block diagram showing the configuration of a vehicle according to an embodiment of the present invention.

FIG. 1 is a block diagram showing the configuration of a vehicle 10 (hereinafter also referred to as a user's own vehicle or a "host vehicle 10") according to an embodiment of the present invention. The vehicle 10 includes an object recognition device (object recognition apparatus) 12, a vehicle stability assist system 14 (hereinafter referred to as a "VSA system 14"), an electric power steering system 16 (hereinafter referred to as an "EPS system 16"), a pop-up hood system 18 (hereinafter referred to as a "PUH system 18"), a vehicle speed sensor 20, and a warning device 22.

The object recognition device 12 detects various types of objects 100 (e.g., other vehicles, pedestrians (people), and walls, etc.) around the periphery of the host vehicle 10. In addition, among such objects 100 (hereinafter also referred to as "detection objects 100"), the object recognition device 12 selects or identifies as a target object 100tar an object that serves in relation to (i.e., as a basis for) controlling the host vehicle 10. The object recognition device 12 calculates a distance L from the host vehicle 10 to the target object 100tar, together with determining attributes Prtar of the target object 100tar. In this regard, as such attributes Prtar, for example, there may be included the type Ca (e.g., vehicle, pedestrian, or wall) of the target object 100tar.

An electronic control unit 30 of the VSA system 14 (hereinafter referred to as a "VSA ECU 30") implements a vehicle behavior stabilizing control process, which through controlling a non-illustrated brake system or the like, stabilizes the behavior of the vehicle 10 when another vehicle 102 (see FIG. 3) comes into proximity to or approaches the host vehicle 10 during turning along a curved road.

An electronic control unit 32 of the EPS system 16 (hereinafter referred to as an "EPS ECU 32") serves to perform a steering assistance control process. The EPS ECU 32 controls constituent components (an electric motor, a torque sensor, and a steering angle sensor, etc., none of which are shown) of an electric power steering apparatus to assist the driver in steering the vehicle 10.

An electronic control unit 34 of the PUH system 18 (hereinafter referred to as a "PUH ECU 34") serves to flip open a pop-up hood (not shown) of the vehicle 10 in the event that the vehicle 10 is involved in a collision with a pedestrian, to thereby soften the impact when the pedestrian's head comes into contact with or hits the vehicle.

The vehicle speed sensor 20 detects the velocity V [km/h] of the vehicle 10 and outputs the detected velocity to the object recognition device 12, etc. The warning device 22 carries out a warning process (i.e., issues an alarm or the like) with respect to the driver, based on a command from the object recognition device 12 etc. The warning device 22 may include, for example, a non-illustrated display device and a speaker.

A1-2. Object Recognition Device 12

As shown in FIG. 1, the object recognition device 12 includes a radar 40, a camera 42, and an object recognition electronic control unit 44 (hereinafter referred to as an "object recognition ECU 44" or an "ECU 44").

A1-2-1. Radar 40

The radar 40 outputs to the exterior of the vehicle 10 transmitted waves Wt, which are electromagnetic waves (in the present case, millimeter waves), and receives reflected waves Wr, which are reflected by the detection object 100 (e.g., another vehicle 102 or a pedestrian) from among the transmitted waves Wt and are returned back to the radar 40. In addition, a detection signal corresponding to the reflected waves Wr (hereinafter referred to as a "reflected wave signal Swr" or a "signal Swr") is output to the ECU 44. Hereinafter, the detection object 100 that is detected by the radar 40 may also be referred to as a "first peripheral object 100r" or a "radar target 100r".

The radar 40 is arranged on a frontward side (e.g., the front bumper and/or the front grill) of the vehicle 10. In addition to or in place of the frontward side, the radar 40 may be arranged on a rearward side (e.g., the rear bumper and/or the rear grill) or on a side (e.g., a side of the front bumper) of the vehicle 10.

Further, as will be described later, in place of the radar 40, which outputs millimeter waves, a laser radar, or a sensor such as an ultrasonic wave sensor or the like, can be used.

A1-2-2. Camera 42

The camera 42 (image capturing unit) acquires an image Imc (hereinafter also referred to as a "peripheral image Imc" or a "captured image Imc") around the periphery of the vehicle 10 (including the target object 100tar). In addition, a signal corresponding to the image Imc (hereinafter referred to as an "image signal Sic" or a "signal Sic") is output to the ECU 44. Hereinafter, the detection object 100 that is detected by the camera 42 may also be referred to as a "second peripheral object 100c" or a "camera target 100c".

Although only one camera 42 is used in the present embodiment, a stereo camera system may be constituted from two cameras 42 arranged with bilateral symmetry. The camera 42 captures images Imc at a rate of fifteen frames or more (for example, thirty frames) per second. Although the camera 42 is a monochrome (black and white) camera that makes use of light having wavelengths primarily in the visible light range, a color camera or an infrared camera may also be used. The camera 42, for example, is disposed in a central part in a widthwise direction of the vehicle, on a front portion (e.g., in the vicinity of the rearview mirror) in the passenger compartment of the vehicle 10. Alternatively, the camera 42 may be disposed in a central part in the widthwise direction on the front bumper of the vehicle 10.

A1-2-3. Object Recognition ECU 44

The object recognition ECU 44 serves to control the object recognition device 12 in its entirety, and as shown in FIG. 1, includes an input/output unit 50, an arithmetic processing unit 52, and a memory unit 54.

Reflected wave signals Swr from the radar 40 and image signals Sic from the camera 42 are supplied to the object recognition ECU 44 through the input/output unit 50. Further, communications between the object recognition ECU 44 and the VSA ECU 30, the EPS ECU 32, and the PUH ECU 34 are carried out through the input/output unit 50 and a communication line 56. The input/output unit 50 is equipped with a non-illustrated A/D converter for converting input analog signals into digital signals.

The arithmetic processing unit 52 performs calculations based on the respective signals Swr, Sic from the radar 40 and the camera 42, and based on the results of such calculations, generates signals that are supplied respectively to the VSA ECU 30, the EPS ECU 32, and the PUH ECU 34.

As shown in FIG. 1, the arithmetic processing unit 52 includes a radar information processor 60, a camera information processor 62, a target object information processor 64, and a driving support control unit 66. Each of the processors 60, 62, 64 and the control unit 66 are realized by executing programs that are stored in the memory unit 54. Such programs may be supplied externally through a non-illustrated wireless communications device (e.g., a mobile phone, a smart phone, or the like). Further, portions of the programs can also be constituted as hardware (circuit elements).

The radar information processor 60 calculates information (hereinafter referred to as "radar information Ir" or "information Ir") concerning the detection object 100 (first peripheral object 100r), based on the reflected waves Wr (reflected wave signals Swr) detected by the radar 40. The camera information processor 62 calculates information (hereinafter referred to as "camera information Ic" or "information Ic") concerning the detection object 100 (second peripheral object 100c), based on the peripheral image Imc acquired by the camera 42.

The target object information processor 64 calculates combined information (hereinafter referred to as "target object information It" or "information It") made up from a combination of the radar information Ir calculated by the radar information processor 60 and the camera information Ic calculated by the camera information processor 62. Stated otherwise, the processor 64 performs so-called fusion processing. The information It is information concerning the target object 100tar, which is identified based on the detection object 100 (radar target 100r) detected by the radar 40, and the detection object 100 (camera target 100c) detected by the camera 42.

The processor 64 is equipped with a target object setting unit 70 (hereinafter also referred to as a "setting unit 70"), a TTC calculating unit 72 (hereinafter also referred to as a "calculating unit 72"), and a certainty calculating unit 74 (hereinafter also referred to as a "calculating unit 74").

The target object setting unit 70 sets a target object 100tar by matching the first peripheral object 100r and the second peripheral object 100c, using the radar information Ir (first position information) and the camera information Ic (second position information). The TTC calculating unit 72 calculates a TTC (Time to Collision) indicating an amount of time until the host vehicle 10 will come into contact (or collide) with the target object 100tar. The certainty calculating unit 74 calculates a degree of certainty Dc that the target object 100tar is a sideways oriented vehicle. The degree of certainty Dc implies an amount of certainty or likelihood that the target object 100tar, which has been judged from the attributes Prc (type Ca) of the camera target 100c to be a sideways oriented vehicle, is in fact a sideways oriented vehicle.

The memory unit 54 is constituted from a RAM (Random Access Memory), which stores image signals that have been converted into digital signals, and temporary data or the like that is subjected to various types of operations or arithmetic processes, and a ROM (Read Only Memory), which stores executable programs, tables, or maps, etc.

A2. Driving Support Control

A2-1. Overall Flow of Driving Support Control Process

Figure 2:
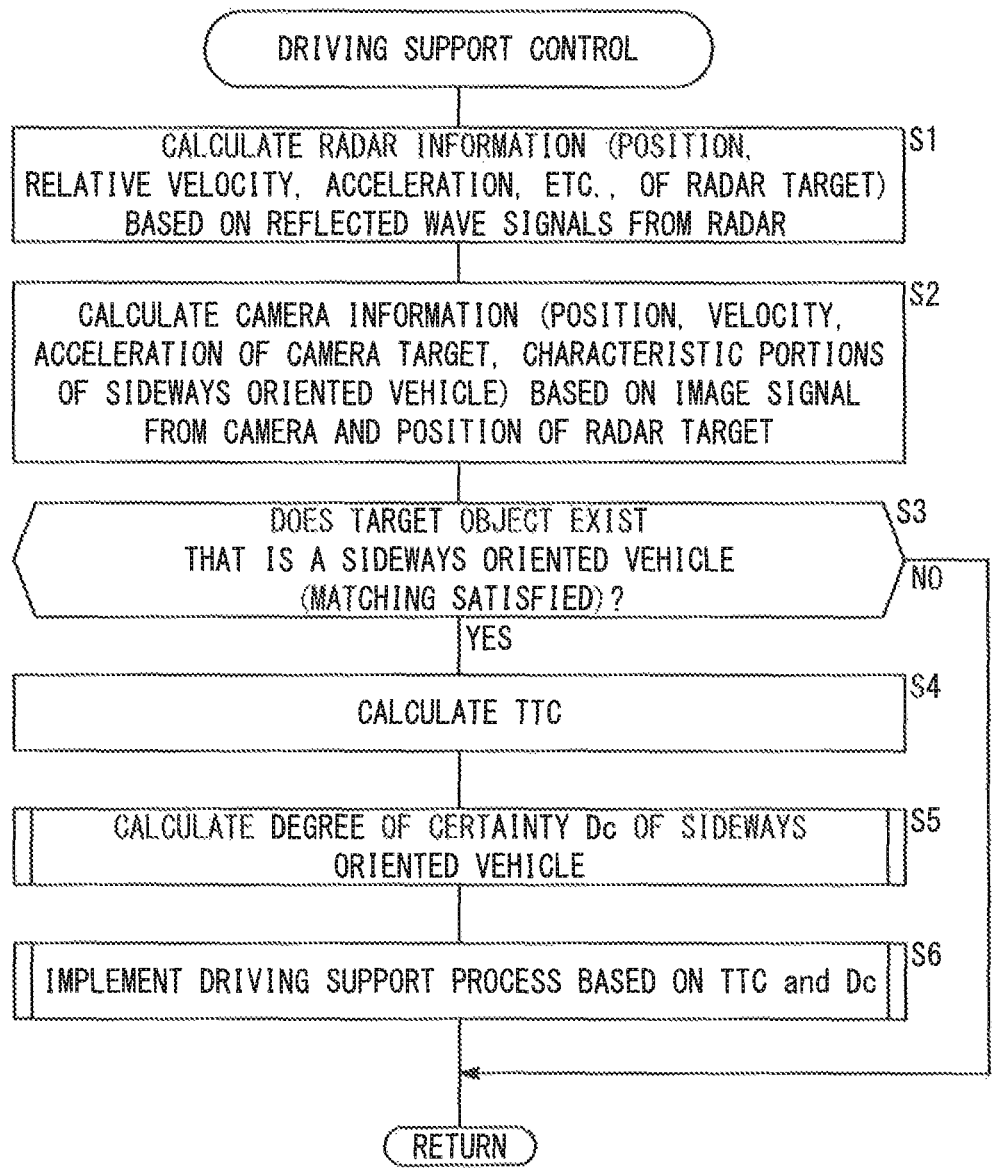
FIG. 2 is a flowchart of a driving support control process performed in the aforementioned embodiment.

FIG. 2 is a flowchart of a driving support control process performed in the present embodiment. The driving support control process is executed by the arithmetic processing unit 52 (the processors 60, 62, 64 and the control unit 66) of the object recognition ECU 44, and arithmetic processing units (not shown) of other ECUs 30, 32, and 34. Although the content shown in FIG. 2 is focused on a case in which the target object 100tar is a sideways oriented vehicle, for cases in which the target object 100tar is not a sideways oriented vehicle, additional steps can be provided in combination with or independently from the respective steps shown in FIG. 2.

In step S1, based on the reflected wave signals Swr from the radar 40, the object recognition ECU 44 (radar information processor 60) calculates the radar information Ir of the detection object 100 (radar target 100r). In the radar information Ir, there are included the position Por of the first peripheral object 100r, relative speed Vr with respect to the vehicle 10, and acceleration ar, etc. In the case that a plurality of first peripheral objects 100r exist within the detection region (a scanning area 106r shown in FIG. 3) of the radar 40, the ECU 44 calculates the position Por, the velocity Vr, and the acceleration ar, etc., with respect to each of the first peripheral objects 100r.

In step S2, based on the image signals Sic (captured image Imc) from the camera 42 and the position Por of the radar target 100r, the ECU 44 (camera information processor 62) calculates the camera information Ic of the detection object 100 (camera target 100c). More specifically, the ECU 44 extracts the camera target 100c inside of a predetermined distance from the position Por (matching process), and then calculates the camera information Ic of the camera target 100c. The predetermined distance referred to herein includes lateral, vertical, and longitudinal directions.

In the camera information Ic, there are included the position Poc in the lateral direction, the velocity Vlc in the lateral direction, the acceleration alc in the lateral direction, and attributes Prc, etc., of the camera target 100c. Further, as attributes Prc, there are included the type Ca (pedestrian, vehicle (sideways oriented vehicle), etc.), size, etc. of the camera target 100c. In the case that the type Ca is a sideways oriented vehicle, a characteristic portion Pcha of the sideways oriented vehicle also is included. Further, in the case that multiple camera targets 100c exist within the captured image Imc, the ECU 44 calculates the position Poc in the lateral direction, the velocity Vlc in the lateral direction, the acceleration alc in the lateral direction, and the attributes Prc, etc., of each of the camera targets 100c.

In step S3, the ECU 44 (target object setting unit 70) judges whether or not a target object 100tar, which is a sideways oriented vehicle, is present (stated otherwise, whether or not matching is satisfied).

In the case that a target object 100*tar*, which is a sideways oriented vehicle, is not present (step S3: NO), the process in the present computation cycle is brought to an end. Thereafter, after elapse of a predetermined time, processing is started again from step S1. In the case that a target object 100*tar*, which is a sideways oriented vehicle, is present (step S3: YES), then in step S4, the ECU 44 calculates the TTC. As described above, the TTC indicates the time until the host vehicle 10 will come into contact (or collide) with the target object 100*tar*.

In step S5, the ECU 44 calculates the degree of certainty Dc that the target object 100*tar* is a sideways oriented vehicle. As noted above, the degree of certainty Dc implies an amount of certainty or likelihood that the target object 100*tar*, which has been judged from the attributes Prc (type Ca) of the camera target 100*c* to be a sideways oriented vehicle, is in fact a sideways oriented vehicle. More specifically, according to the present embodiment, even in the case that a judgment has been made in step S3 that a target object 100*tar*, which is a sideways oriented vehicle, exists, consideration is given to the fact that there is a possibility that the target object 100*tar* might not be a sideways oriented vehicle. Further details of step S5 will be described below with reference to FIG. 5.

In step S6, the ECU 44 executes a driving support process based on the TTC (step S4) and the degree of certainty Dc (step S5). Further details of step S6 will be described below with reference to FIG. 7.

A2-2. Calculation of Radar Information Ir and Camera Information Ic (steps S1, S2 of FIG. 2)

A2-2-1. Conceptual Outline for Calculation of Radar Information Ir and Camera Information Ic FIG. 3 is a descriptive drawing for explaining the driving support control process of the aforementioned embodiment. In the figure, a situation is shown in which another vehicle 102 is driving across a path 104 on which the host vehicle 10 also is being driven. More specifically, in FIG. 3, there are shown a scanning area 106*r* (first detection region) of the radar 40, an image capturing area 106*c* (second detection region) of the camera 42, a mark 108 indicating the position Por of the radar target 100*r*, marks 110*l*, 110*r*, 112*l*, 112*r*, 114 indicating characteristic portions Pcha of the other vehicle 102, which is a sideways oriented vehicle, a radar target assumed area 116, and a camera target assumed area 118.

In step S1 of FIG. 2, when the radar information Ir is acquired, based on the reflected wave signals Swr, the ECU 44 calculates the position Por (mark 108) of the radar target 100*r*. The position Por is defined by a center or a gravitational center of a region indicated by an aggregate of the reflected waves Wr from the radar target 100*r*. Alternatively, the position Por may be defined as a position at which a reception level is highest from among the aggregate of the reflected waves Wr. In the example of FIG. 3, the mark 108 indicating the position Por is shown by a gravitational center position of the other vehicle 102.

In step S2 of FIG. 2, when the camera information Ic is acquired, on the basis of the position Por of the radar target 100*r*, the ECU 44 extracts the camera target 100*c* from within a predetermined distance. Such an extraction implies substantially that the radar information Ir and the camera information Ic match with one another. As discussed above, the predetermined distance includes lateral, vertical, and longitudinal directions.

Upon extracting the camera target 100*c*, within the aforementioned predetermined distance, characteristic portions Pcha of the target object 100*tar*, which is a sideways oriented vehicle, are extracted. More specifically, as shown in FIG. 3, vertical edges (marks 110*l*, 110*r*) on a front end (left end) and a rear end (right end) of the other vehicle 102, circular edges (marks 112*l*, 112*r*) of a front wheel (left side wheel) and a rear wheel (right side wheel), and a horizontal edge (mark 114) on a lower portion of the vehicle body are extracted as characteristic portions Pcha. The ECU 44 judges that a target object 100*tar*, which is a sideways oriented vehicle, exists from the presence of the aforementioned characteristic portions Pcha. The characteristic portions Pcha are not limited to the aforementioned five portions, and within such portions, any number thereof may be selected and used. Further, other characteristic portions Pcha apart from the five portions mentioned above can be used.

A2-2-2. Example of Mistaken Recognition

FIG. 4 is a drawing showing an example in which the target object setting unit 70 mistakenly recognizes a target object 100*tar*, and erroneously judges the presence of a sideways oriented vehicle. In the example shown in FIG. 4, although another vehicle 102 (an actual vehicle) does not exist in the path 104 of the host vehicle 10, the ECU 44 mistakenly recognizes the presence of a sideways oriented vehicle, as a result of having extracted (and determining success upon matching) the position Por of the radar target 100*r* and the characteristic portions Pcha of a (non-existent) sideways oriented vehicle.

More specifically, in the left side portion of the path 104, a foundation 132 of a post 130 exists that faces toward the path 104. In this case, the radar information processor 60, having received a high reception level of the reflected waves Wr from the portion of the foundation 132, recognizes the position Por (mark 108) of the radar target 100*r*.

Further, from the fact that the post 130 extends vertically, the camera information processor 62 extracts the portion of the post 130 as a vertical edge (mark 110*l*) of a left side end (front end or rear end) of a sideways oriented vehicle. Furthermore, a barrier 134 comprising a main body 136 and a blocking bar 138 exists on the right side of the path 104, and the main body 136 includes a vertical portion. Therefore, the camera information processor 62 extracts the portion of the barrier main body 136 as a vertical edge (mark 110*r*) of a right side end (front end or rear end) of a sideways oriented vehicle.

A curb 140 is disposed on the left side of the path 104. From the contrast between the curb 140 and the foundation 132 of the post 130, the camera information processor 62 extracts the portion of the curb 140 as a circular edge (mark 112*l*) of a wheel (front wheel or rear wheel) on the left side of a sideways oriented vehicle. Another curb 142 is disposed on the right side of the path 104. From the shape, etc., of a corner portion of the curb 142, the camera information processor 62 extracts the portion of the curb 142 as a circular edge (mark 112*r*) of a wheel (front wheel or rear wheel) on the right side of a sideways oriented vehicle.

On the path 104 of the host vehicle 10, a shadow 144 formed by the barrier main body 136 and the blocking bar 138 is cast. From the perspective of the host vehicle 10, such a shadow 144 is seen as substantially horizontal. Therefore, the camera information processor 62 extracts the shadow 144 as a horizontal edge (mark 114) on a lower portion of a sideways oriented vehicle.

As a result of carrying out the above-described extracting steps, according to steps S1 through S3 (see FIG. 2) of the present embodiment, notwithstanding the fact that a target object 100*tar*, which is a sideways oriented vehicle, is not actually present, there still is a possibility that the target object setting unit 70 could recognize in error that a target object 100*tar*, which is a sideways oriented vehicle, exists. Thus, according to the present embodiment, by utilizing the degree of certainty Dc in relation to the presence of a sideways oriented vehicle, a mistaken recognition such as that described above is prevented.

A2-3. Calculation of Degree of Certainty Dc in Relation to Presence of Sideways Oriented Vehicle (Step S5 of FIG. 2)

A2-3-1. Conceptual Outline for Calculation of Degree of Certainty Dc

FIG. 5 is a flowchart (details of step S5 of FIG. 2) of a process for calculating a degree of certainty Dc in detecting the presence of a sideways oriented vehicle. The process of FIG. 5 is performed by the certainty calculating unit 74 of the ECU 44. FIG. 6 is a diagram for describing a judgment standard and method of use (content of a driving support process) of the degree of certainty Dc in the aforementioned embodiment. Vehicles 150 shown by the broken lines in FIG. 6 are indicative of vehicles that were recognized by the target object setting unit 70, but for which it is not yet clear whether or not such vehicles are actual vehicles (other vehicles 102). Stated otherwise, in FIG. 6, target objects 100*tar*, which may be properly or mistakenly recognized by the target object setting unit 70, are shown as the vehicles 150. As discussed above, when the degree of certainty Dc is calculated, a judgment is made that a target object 100*tar*, which is a sideways oriented vehicle, exists (step S3 of FIG. 2: YES).

In step S11 of FIG. 5, the ECU 44 judges whether or not the position Por of the radar target 100*r* resides within the radar target assumed area 116 (hereinafter referred to as an "assumed area 116" or an "area 116"). The assumed area 116 is an area in which it can be presumed that the position Por of the radar target 100*r* will exist in the case that the target object 100*tar* is a sideways oriented vehicle. Further details of the area 116 will be described later.

If the position Por of the radar target 100*r* is not inside of the assumed area 116 (step S11: NO), then in step S12, the ECU 44 selects "LOW" as the degree of certainty Dc (refer to the third and fourth situations shown in FIG. 6). If the position Por of the radar target 100*r* is within the assumed area 116 (step S11: YES), then the process proceeds to step S13.

In step S13, the ECU 44 judges whether or not the characteristic portions Pcha of a sideways oriented vehicle are included within the camera target assumed area 118 (hereinafter referred to as an "assumed area 118" or an "area 118"). The assumed area 118 is an area in which it can be presumed that the characteristic portions Pcha will exist in the case that the target object 100*tar* is a sideways oriented vehicle.

In the present embodiment, it is determined whether or not all of the characteristic portions Pcha lie within the assumed area 118. Alternatively, it may be determined whether or not a minimally limited group thereof necessary for identifying a sideways oriented vehicle is included within the assumed area 118. As one such minimally limited group, for example, there are included at least one of a vertical edge (mark 110*l*) of a left end and a circular edge (mark 112*l*) of a left side wheel, and at least one of a vertical edge (mark 110*r*) of a right end and a circular edge (mark 112*r*) of a right side wheel of the vehicle 102. Further details of the area 118 will be described later.

If the characteristic portions Pcha are not present within the assumed area 118 (step S13: NO), then in step S14, the ECU 44 selects "MEDIUM" as the degree of certainty Dc (refer to the second situation shown in FIG. 6). If the characteristic portions Pcha are present within the assumed area 118 (step S13: YES), then in step S15, the ECU 44 selects "HIGH" as the degree of certainty Dc (refer to the first situation shown in FIG. 6).

A2-3-2. Assumed Areas 116, 118

A2-3-2-1. Overview

As described above with reference to FIG. 4, in the event that the characteristic portions Pcha of a sideways oriented vehicle in the camera information Ic are used, there is a possibility for mistaken identification to occur. Thus, according to the present embodiment, even in the case that the distance between the position Por of the radar target 100*r* and the position Poc of the camera target 100*c* is of a predetermined value, the degree of certainty Dc is determined through the judgments of steps S11 and S13 (see FIG. 5). Further, with steps S11 and S13, the assumed areas 116 and 118 also are used.

A2-3-2-2. Radar Target Assumed Area 116

As shown in FIG. 3, the radar target assumed area 116 is set on the path 104 of the host vehicle 10 (in particular, symmetrically about a virtual center line Lx). The assumed area 116 is set not only in a lateral direction (in the widthwise direction of the vehicle), but also in a vertical direction (heightwise direction) and a longitudinal direction.

The width Lr of the assumed area 116, for example, can be somewhat longer (e.g., 1.8 to 2.5 m) than the vehicle width of the host vehicle 10 (or a generic passenger car), or of a value (e.g., 2.0 to 3.0 m) that is shorter than the distance (wheelbase) from the front wheels to the rear wheels or the entire length of the host vehicle 10. The height Hr of the area 116 can be of a value (e.g., 0.8 to 1.8 m) that is slightly shorter than the vehicle height of the host vehicle 10 (or a generic passenger car).

Although the assumed area 116 is illustrated as having a linear shape in FIG. 3, the assumed area 116 may be of a curved shape that matches with the curvature of the path 104. In order to make the assumed area 116 in a curved shape, for example, the assumed area 116 can be calculated using a yaw rate, etc., detected by a non-illustrated yaw rate sensor. Further, information relating to the shape of the path 104 can be acquired from a non-illustrated navigation device, or from equipment (roadside equipment) made up of optical beacons or the like that are arranged on the periphery of the path 104, and the assumed area 116 can be calculated using such information.

Further, the width Lr of the assumed area 116 may be changed corresponding to the positions of the characteristic portions Pcha of the target object 100*tar* (sideways oriented vehicle). For example, in the event that the distance between the vertical edges (marks 110*l*, 110*r*) of the left end and the right end of the target object 100*tar* is longer than a given reference value, the width Lr can be made wider, whereas if the distance is shorter than the reference value, the width Lr can be made narrower.

A2-3-2-3. Camera Target Assumed Area 118

As shown in FIG. 3, the camera target assumed area 118 is set on the path 104 of the host vehicle 10 (in particular, symmetrically about a virtual center line Lx). Similar to the assumed area 116, the assumed area 118 is set not only in a lateral direction (in the widthwise direction of the vehicle), but also in a vertical direction (heightwise direction) and a longitudinal direction. However, in the image, based on the position Por of the radar target 100r, the assumed area 118 can be specified in terms of coordinates (a range) of the longitudinal direction. Therefore, when determining whether or not the characteristic portions Pcha reside within the assumed area 118, the assumed area 118 may be limited in the longitudinal direction.

Further, the assumed area 118 includes a range that overlaps with the assumed area 116. The width Lc of the assumed area 118 is of a value that is longer than the width Lr of the assumed area 116. In particular, the width Lc can be of a value that is on the order of, or is longer than, the total length of a generic passenger car (e.g., 3.5 to 7.0 m).

The height Hc of the area 118 can be of a value (e.g., 1.2 to 2.5 m) that is slightly longer than the vehicle height of the host vehicle 10 (or a generic passenger car). However, so long as the characteristic portions Pcha can be detected, the height Hc may have a narrower range. For this reason, cases may occur in which the height Hc of the assumed area 118 is shorter than the height Hr of the assumed area 116. Further, similar to the assumed area 116, the assumed area 118 may have a curved shape.

Further, in the case that the characteristic portions Pcha of the target object 100tar (sideways oriented vehicle) are indicative of a large scale vehicle, for example, the width Lc of the assumed area 118 may be changed corresponding to the positions of the characteristic portions Pcha. For example, in the event that the distance between the vertical edges (marks 110l, 110r) of the left end and the right end of the target object 100tar is longer than a given reference value, the width Lc can be made wider, whereas if the distance is shorter than the reference value, the width Lc can be made narrower.

In the present embodiment, by setting the assumed areas 116, 118 as described above, the assumed area 116 is positioned between the front end and the rear end of the other vehicle 102 (the left end and the right end of the sideways oriented vehicle). The assumed area 116 may also be positioned between the front wheel and the rear wheel of the other vehicle 102 (between the left side wheel and the right side wheel of the sideways oriented vehicle).

A2-4. Driving Support Process (Step S6 of FIG. 2)

Figure 7:
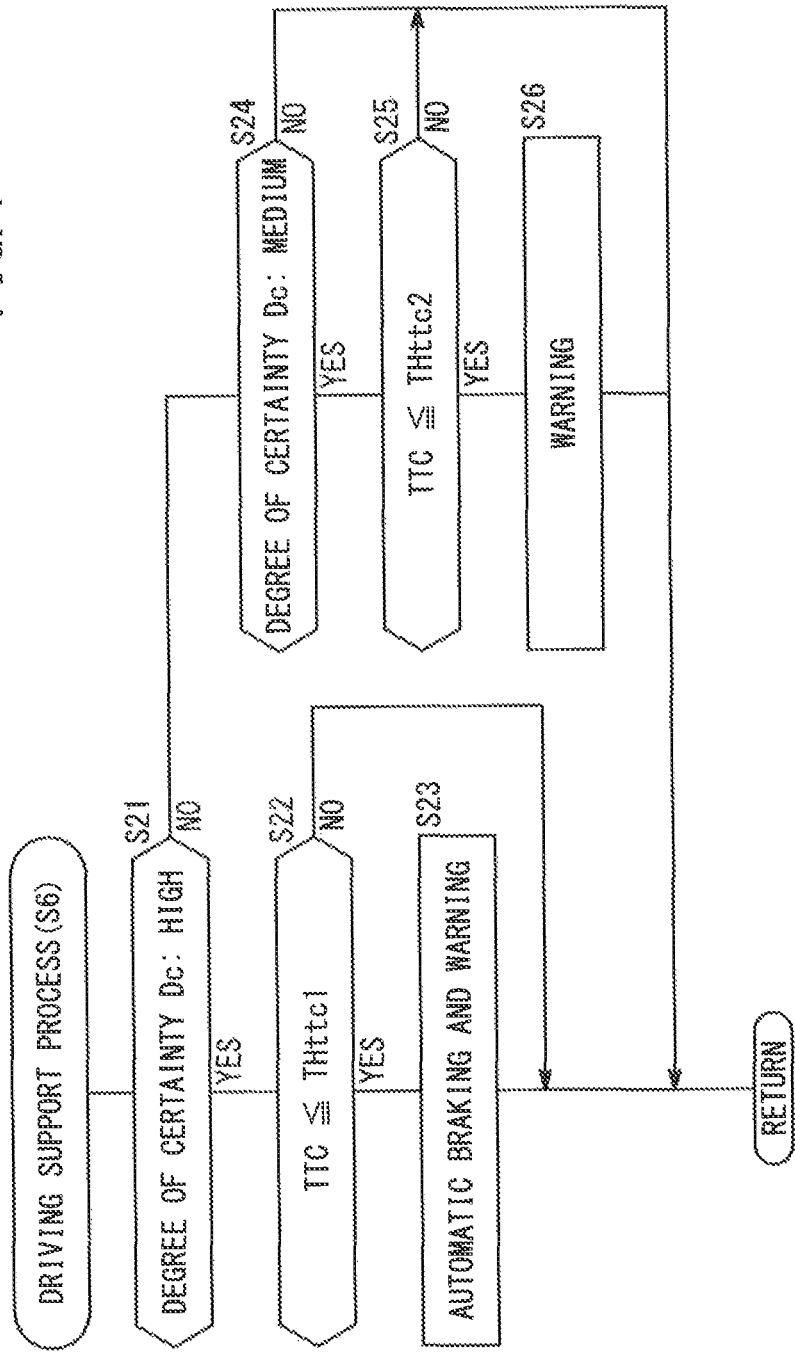
FIG. 7 is a flowchart (details of step S6 of FIG. 2) of the driving support process.

FIG. 7 is a flowchart (details of step S6 of FIG. 2) of the driving support process. In step S21, the ECU 44 judges whether or not the degree of certainty Dc is "HIGH". If the degree of certainty Dc is "HIGH" (step S21: YES), then in step S22, the ECU 44 determines if the TTC is less than or equal to a threshold value Thttc1. The threshold value THttc1 is a threshold value for determining whether or not automatic braking and a warning should be carried out, premised on the degree of certainty Dc being "HIGH".

If the TTC is less than or equal to the threshold value THttc1 (step S22: YES), then in step S23, the ECU 44 implements automatic braking and issues a warning (refer to the first situation shown in FIG. 6). More specifically, the ECU 44 issues a command to implement automatic braking with respect to the VSA ECU 30, and issues a warning through the warning device 22. On the other hand, if the TTC is not less than or equal to the threshold value THttc1 (step S22: NO), the present computation cycle is brought to an end, and after elapse of a predetermined time, processing is started again from step S21.

In step S21, if the degree of certainty Dc is not "HIGH" (step S21: NO), then in step S24, the ECU 44 judges whether or not the degree of certainty Dc is "MEDIUM". If the degree of certainty Dc is "MEDIUM" (step S24: YES), then in step S25, the ECU 44 determines if the TTC is less than or equal to a threshold value Thttc2. The threshold value THttc2 is a threshold value for determining whether or not a warning should be issued, premised on the degree of certainty Dc being "MEDIUM". The threshold value THttc2 may be a value that is less than or greater than the threshold value THttc1.

If the TTC is less than or equal to the threshold value THttc2 (step S25: YES), then in step S26, the ECU 44 issues a warning (refer to the second situation shown in FIG. 6). More specifically, the ECU 44 issues a warning through the warning device 22. If the threshold value THttc2 is less than the threshold value THttc1, then in step S26 as well, automatic braking and a warning may both be carried out, similar to the case of step S23. In this case, since the threshold value THttc2 is less than the threshold value THttc1, due to the fact that timing of the operation is delayed, the control can be carried out using a method that differs from that of step S23. Further, automatic braking can be activated by a method that differs from that of step S23 (i.e., a method in which the braking force is more suppressed), such as by making the braking force applied during automatic braking smaller than in step S23. Furthermore, different warning methods may be used in steps S23 and S26 (for example, if a mild automatic braking action is actuated in step S26, then the warning issued in step S26 can be omitted). If the TTC is not less than or equal to the threshold value THttc2 (step S25: NO), the present computation cycle is brought to an end, and after elapse of a predetermined time, processing is started again from step S21.

Returning to step S24, if the degree of certainty Dc is not "MEDIUM" (step S24: NO), then the degree of certainty Dc is "LOW". In this case, the ECU 44 brings the present computation cycle to an end without taking any action (refer to the third and fourth situations shown in FIG. 6).

A3. Advantages of the Present Embodiment

As described above, if the position Por of the radar target 100r (first peripheral object) exists within the assumed area 116 (first target area) (step S11 of FIG. 5: YES), and the characteristic features Pcha (position Poc of the camera target 100c) of the camera target 100c (second peripheral object) exist within the assumed area 118 (second target area) (step S13: YES), the target object 100tar is treated as a target of the automatic braking (behavior supporting) action (step S15 of FIG. 5, step S21 of FIG. 7: YES, step S23). Further, in the case that the position Por of the radar target 100r does not exist within the assumed area 116 (step S11 of FIG. 5: NO) or the characteristic portions Pcha do not exist within the assumed area 118 (step S13: NO), the target object 100tar is removed from being the target of the automatic braking action, or the automatic braking action with respect to the target object 100tar is suppressed (refer to step S21 and steps S24 to S26 of FIG. 7). The assumed area 116 is set as a portion of the scanning area 106r (first detection region) of the radar 40 (first detecting device), or in other words, as an area that is narrower than the scanning area 106r (see FIG. 3). The assumed area 118 is set as a portion of the image capturing area 106c (second detection region) of the camera 42 (second detecting device), or in other words, as an area that is narrower than the image capturing area 106c (see FIG. 3).

Consequently, by using the assumed areas 116, 118 (first and second target areas), each of which is suitable respectively for the radar 40 and the camera 42, it can be determined whether or not to treat the target object 100tar as a target of the automatic braking (behavior supporting) action, or whether or not to suppress the automatic braking action. Accordingly, selection of a target object 100tar or determining the presence of the target object 100tar as a target of the automatic braking action can be performed with high accuracy, or setting of a level for the automatic braking action can be performed appropriately.

With the present invention, using the radar 40 as the first detecting device, and using the camera 42 as the second detecting device, the driving support control unit 66 (behavior support control device) sets the radar target assumed area 116 (first target area) to be narrower than the camera target assumed area 118 (second target area) (see FIG. 3).

In accordance with this feature, the assumed area 116 based on the radar 40 is set as an area that is narrower than the scanning area 106r (first detection region) of the radar 40, and the assumed area 118 based on the camera 42 is set as an area that is narrower than the image capturing area 106c (second detection region) of the camera 42 (see FIG. 3). In general, the radar 40 is weak or performs poorly at detecting edges of objects 100. Further, in the case that the radar 40 is arranged in the vehicle 10, based on reflected waves Wr from roadside obstructions such as curbs 140 or the like on the path 104 (road), there is a possibility to erroneously recognize such obstructions as target objects 100tar (see FIG. 4). According to the present invention, the assumed area 116 based on the radar 40 is set relatively narrow, whereas the assumed area 118 based on the camera 42 is set relatively wide (see FIG. 3). Consequently, by using the detection result of the camera 42 in relation to areas where the radar 40 is week or poor in performance, selection of a target object 100tar or determining the presence of the target object 100tar as a target of the driving support (behavior supporting) action can be performed with high accuracy, or setting of a level for an automatic braking action can be performed appropriately.

If the position Por of the radar target 100r (first peripheral object) exists within the assumed area 116 (first target area) (step S11 of FIG. 5: YES), and all of the characteristic features Pcha (image features) of the camera target 100c (second peripheral object) exist within the assumed area 118 (second target area) (step S13: YES), the driving support control unit 66 (behavior support control device) treats the target object 100tar as the target of the automatic braking (behavior supporting) action (step S15 of FIG. 5, step S21 of FIG. 7: YES, step S23).

In accordance with this feature, by treating a target object 100tar, the entirety of which is captured by the camera 42, as the target of the automatic braking action, selection of the target object 100tar or determining the presence of the target object 100tar as the target of the automatic braking action can be performed with high accuracy, or setting of a level for the automatic braking action can be performed appropriately.

In the present embodiment, the target object 100tar is a sideways oriented vehicle (step S3 of FIG. 2: YES), and the characteristic portions Pcha (image features) of the sideways oriented vehicle include vertical edges (marks 110l, 110r) on a left end and a right end of the sideways oriented vehicle (front end and rear end of the other vehicle 102), circular edges (marks 112l, 112r) of left and right wheels (a front wheel and a rear wheel of the other vehicle 102), and a horizontal edge (mark 114) on a lower portion of the vehicle body (see FIG. 3). Owing to this feature, the presence of a sideways oriented vehicle can be determined with high accuracy.

In the present embodiment, the target object setting unit 70 (target object setting device) recognizes the target object 100tar as being a sideways oriented vehicle existing on a path 104 (travel path) of the host vehicle 10 (step S3 of FIG. 2, FIG. 3). Further, the driving support control unit 66 (behavior support control device) sets the radar target assumed area 116 (first target area) and the camera target assumed area 118 (second target area) so as to lie on the path 104 (travel path) of the vehicle 10 (mobile object) (see FIG. 3).

As a result, even in the case that the target object setting unit 70 (target object setting device) mistakenly recognizes that a sideways oriented vehicle exists as a target object 100tar on the path 104 of the vehicle 10 (mobile object), the target object 100tar can be removed from being the target of the automatic braking (behavior supporting) action, or the automatic braking action with respect to the target object 100tar can be suppressed.

B. Modifications

The present invention is not limited to the above embodiment, but may adopt various alternative or additional arrangements based on the content disclosed in the present specification. For example, the following arrangements may be adopted.

B1. Objects to Which the Present Invention is Applicable

In the above embodiment, the object recognition device 12 is applied to a vehicle 10. However, the present invention is not limited to this application, and may be applied to other objects. For example, the object recognition device 12 may be incorporated in mobile objects such as ships, aircrafts, etc. Alternatively, the object recognition device 12 may be incorporated in robots, security-related monitoring apparatus, or electric home appliances. Further, the object recognition device 12 need not necessarily be disposed in the vehicle 10 (mobile object) itself, but may be arranged externally of the vehicle 10 (for example, in a roadside device such as an optical beacon or the like). In this case, communications can be carried out between the vehicle 10 and the object recognition device 12, and the recognition results of the object recognition device 12 (i.e., the TTC, the degree of certainty Dc, or the target object information It) can be transmitted to the vehicle 10.

B2. Configuration of Object Recognition Device 12

In the above embodiment, the judgment results of the object recognition device 12 (i.e., the TTC, the degree of certainty Dc, or the target object information It) are used primarily by the object recognition device 12 itself (step S6 of FIG. 2, FIG. 7). However, the aforementioned judgment results can be output to the VSA ECU 30, the EPS ECU 32, and the PUH ECU 34, and used independently by the VSA ECU 30, the EPS ECU 32, and the PUH ECU 34.

In the above embodiment, the radar 40 is used, which makes use of transmitted waves Wt and reflected waves Wr in the form of millimeter waves. However, the present invention is not limited to this feature. For example, from the standpoint of obtaining information Ir of the first peripheral object 100r using transmitted waves Wt and reflected waves Wr as electromagnetic waves, a laser radar, or a sensor such as an ultrasonic wave sensor or the like, can also be used.

According to the present embodiment, the radar 40 and the camera 42 are used in combination (see FIG. 1). However, from the standpoint of determining whether or not to treat the target object 100tar as a target of the driving support (behavior supporting) action using assumed areas (assumed areas 116, 118, etc.) suitable respectively for plural or plural types of detection devices that serve to detect the objects 100, the present invention is not limited to this feature. For example, a combination made up from a laser radar and the radar 40 that outputs millimeter waves can be used.

B3. Control of Object Recognition ECU 44

B3-1. Attributes of the Target Object 100tar (Step S3 of FIG. 2, FIG. 3)

In the above embodiment, the attributes Prtar of the target object 100tar have been described focusing on a sideways oriented vehicle (step S3 of FIG. 2, FIG. 3). However, from the standpoint of using the radar target assumed area 116 alone or a combination of the assumed areas 116 and 118, the invention is not limited to this feature. For example, even in the case that the target object 100tar is a preceding vehicle that is traveling on the same path 104 as the host vehicle 10, using the radar target assumed area 116 alone or a combination of the assumed areas 116 and 118, the degree of certainty Dc of the target object 100tar can be determined.

B3-2. Calculation of Degree of Certainty Dc (step S5 of FIG. 2, FIG. 5)

According to the present embodiment, the assumed areas 116, 118 are set on the basis of the path 104 of the host vehicle 10 (FIG. 3). However, for example, insofar as attention is focused on the relationship between the position Por of the radar target 100r and the positions of the characteristic portions Pcha of the camera target 100c, the invention is not limited to this feature. For example, the assumed areas 116, 118 can be set using the position Por (or the positions of the characteristic portions Pcha) as a basis.

For example, when setting the assumed areas 116, 118 on the basis of the position Por, the assumed areas 116, 118 are moved by the same amount from the positions thereof that are set as shown in FIG. 3 (on the path 104 of the host vehicle 10).

In the case that the assumed areas 116, 118 are set on the basis of the position Por (or in cases apart therefrom), the width Lr of the assumed area 116 may also be made narrower than the value of the above-described embodiment (see FIG. 3). For example, the width Lr can be set in conformity with the interval between the left end and the right end (marks 110l, 110r), or with the interval between the circular edges (marks 112l, 112r) that make up the left and right wheels of a sideways oriented vehicle. Alternatively, the width Lr may be set in conformity with the interval between the vertical edge (mark 110l) that makes up the left end and the circular edge (mark 112r) that makes up the right side wheel of a sideways oriented vehicle, or with the interval between the vertical edge (mark 110r) that makes up the right end and the circular edge (mark 112l) that makes up the left side wheel of a sideways oriented vehicle.

In the above embodiment, in order to calculate the degree of certainty Dc of the presence of a sideways oriented vehicle, it is determined whether or not the position Por of the radar target 100r resides within the assumed area 116 (step S11 of FIG. 5), and whether or not the characteristic portions Pcha of the sideways oriented vehicle reside within the assumed area 118 (step S13). However, the method for calculating the degree of certainty Dc is not limited to this technique.

For example, in addition to steps S11 and S13 of FIG. 5, the degree of certainty Dc may be calculated by determining whether or not a center or a gravitational center (mark 108) of the radar target 100r is positioned between the left end and the right end (marks 110l, 110r) of a sideways oriented vehicle.

In accordance with this technique, based on the detection result of the radar 40, in the case that the center or the gravitational center (mark 108) of the radar target 100r (first peripheral object) exists at a position that differs from the center or the gravitational center of a sideways oriented vehicle, it can be determined that the target object 100tar is not a sideways oriented vehicle. Therefore, selection of a target object 100tar or determining the presence of the target object 100tar as a target of the automatic braking action can be performed with high accuracy, or setting of a level for the automatic braking action can be performed appropriately.

Further, instead of determining whether or not the center or the gravitational center (mark 108) of the radar target 100r is positioned between the left end and the right end (marks 110l, 110r) of a sideways oriented vehicle, it may be determined whether or not the center or the gravitational center (mark 108) of the radar target 100r is positioned between the circular edges (marks 112l, 112r) that make up the left and right wheels. Alternatively, it may be determined whether or not the center or the gravitational center (mark 108) of the radar target 100r is positioned between the vertical edge (mark 110l) that makes up the left end and the circular edge (mark 112r) that makes up the right side wheel of a sideways oriented vehicle, or between the vertical edge (mark 110r) that makes up the right end and the circular edge (mark 112l) that makes up the left side wheel of a sideways oriented vehicle.

B3-3. Driving Support Process (step S6 of FIG. 2, FIG. 7)

According to the above embodiment, in addition to the degree of certainty Dc, the TTC (Time to Collision) is used in the driving support process (steps S22 and S25 of FIG. 7). However, for example, insofar as attention is focused on the function of the degree of certainty Dc, it is possible to dispense with use of the TTC. In this case, from the standpoint of determining a time limit that is similar to the TTC, a range of distances in the longitudinal direction (traveling direction of the host vehicle 10) can be set or delimited within the assumed areas 116, 118.

In the above embodiment, although automatic braking has been cited as an example of the driving support action (the first situation shown in FIG. 6 and step S23 of FIG. 7) a different driving support action, such as steering assistance or the like, can also be provided. Further, in the case that the present invention is applied to a mobile object apart from the vehicle 10, instead of a driving support action, another type of behavior supporting action can be implemented.

B3-4. Other Features

According to the above embodiment, after establishing a relationship between the position Por of the radar target 100r and the characteristic portions Pcha of the camera target 100c (stated otherwise, after matching), the position Por and the positions of the characteristic portions Pcha are contrasted with the assumed areas 116, 118 (FIGS. 2 and 5). However, the invention is not limited to this feature, insofar as at least one of the assumed areas 116, 118 can be used.

For example, it is possible to incorporate use of the assumed areas 116, 118 into the matching process. More specifically, extraction of the characteristic portions Pcha can be performed in relation only to a range (lateral direction, vertical direction, and longitudinal direction) in which each of the characteristic portions Pcha exists on the basis of the position Por of the radar target 100r, for matching with the position Por. The extraction area in this instance is a range corresponding to the camera target assumed area 118.

Owing to this feature, the assumed area 118 (characteristic portion target area) (i.e., a portion of the image capturing area 106c of the camera 42) for extracting the characteristic portions Pcha of the sideways oriented vehicle can be set as a comparatively narrow area on the basis of the position Por of the radar target 100r (first peripheral object) that is detected by the radar 40. Accordingly, selection or determination of the presence of the target object 100tar, which is a sideways oriented vehicle, can be carried out with high accuracy and a small amount of computation.

What is claimed is:

1. A vehicle control system including an object recognition apparatus comprising:
    a first detecting device configured to detect first position information indicating a position of a first peripheral object that exists within a first detection region established around a periphery of a vehicle on which the vehicle control system is provided;
    a second detecting device configured to detect second position information indicating a position of a second peripheral object that exists within a second detection region established around the periphery of the vehicle, wherein the second detection region overlaps with all or a portion of the first detection region;
    an electronic control unit configured to receive and process the first position information and the second position information, and to control operation of the vehicle based thereon,
    wherein the electronic control unit comprises:
    a target object setting unit configured to set a target object when the first peripheral object and the second peripheral object are linked as a same object based on the first position information and the second position information; and
    a driving support control unit configured to control at least one of an automatic braking system and a steering assistance system as a driving supporting action of the vehicle in relation to the target object;
    wherein the driving support control unit is configured to:
    set a first target area which is used to judge whether or not the target object is to be treated as a target of the driving supporting action, as a portion of the first detection region; and
    set a second target area which is used to judge whether or not the target object is to be treated as the target of the driving supporting action, as a portion of the second detection region, the second target area being set to encompass the first target area;
    wherein, when the position of the first peripheral object exists within the first target area and the position of the second peripheral object exists within the second target area, the driving support control unit treats the target object as the target of the driving supporting action; and
    wherein, when the position of the first peripheral object does not exist within the first target area or the position of the second peripheral object does not exist within the second target area, the driving support control unit does not treat the target object as the target of the driving supporting action, or the driving support control unit suppresses the driving supporting action with respect to the target object.

2. The vehicle control system according to claim 1, wherein:
    the first detecting device is a radar; and
    the second detecting device is a camera.

3. The vehicle control system according to claim 2, wherein the driving support control unit treats the target object as the target of the driving supporting action if the position of the first peripheral object exists within the first target area and an image feature of the second peripheral object exists entirely within the second target area.

4. The vehicle control system according to claim 3, wherein:
    the target object is a vehicle oriented sideways relative to a travel path of the vehicle on which the vehicle control system is provided; and
    the image feature includes at least one of a vertical edge constituting a left end of the sideways oriented vehicle and a circular edge constituting a left side wheel of the sideways oriented vehicle, and at least one of a vertical edge constituting a right end of the sideways oriented vehicle and a circular edge constituting a right side wheel of the sideways oriented vehicle.

5. The vehicle control system according to claim 4, wherein:
    in a case that a center or a gravitational center of the first peripheral object is positioned between the left end and the right end, or is positioned between the left side wheel and the right side wheel of the sideways oriented vehicle, the driving support control unit treats the target object as being the target of the driving supporting action; and
    in a case that a center or a gravitational center of the first peripheral object is not positioned between the left end and the right end or is not positioned between the left side wheel and the right side wheel of the sideways oriented vehicle, the driving support control unit removes the target object from being the target of the driving supporting action.

6. The vehicle control system according to claim 1, wherein:
    the target object setting unit recognizes the target object as being a sideways oriented vehicle existing on a travel path of the vehicle; and
    the driving support control unit sets the first target area and the second target area so as to lie on the travel path.

7. A vehicle control system including an object recognition apparatus comprising:
    a radar configured to detect first position information indicating a position of a first peripheral object that exists within a first detection region established around a periphery of a vehicle on which the vehicle control system is provided;

a camera configured to detect second position information indicating a position of a second peripheral object that exists within a second detection region established around the periphery of the vehicle, wherein the second detection region overlaps with all or a portion of the first detection region; and an electronic control unit configured to receive and process the first position information and the second position information, and to control operation of the vehicle based thereon, wherein the electronic control unit comprises:

a target object setting unit configured to set a target object, which is a vehicle oriented sideways relative to a travel path of the vehicle on which the vehicle control system is provided, when the first peripheral object and the second peripheral object are linked as a same object based on the first position information and the second position information, wherein the target object setting unit is configured to:

set a characteristic portion target area which is used to extract a characteristic portion of the sideways oriented vehicle, on a basis of a position of the first peripheral object and as a portion of the second detection region; and judge the first peripheral object and the second peripheral object as being the same target object, which is the sideways oriented vehicle, when the characteristic portion of the sideways oriented vehicle exists within the characteristic portion target area.

* * * * *